(12) United States Patent
Braga et al.

(10) Patent No.: US 6,204,330 B1
(45) Date of Patent: Mar. 20, 2001

(54) POLYMER MIXTURE FOR SLUSH MOLDING

(75) Inventors: Vittorio Braga, Ferrara; Carlo Mulas, Mogliano Veneto; Ugo Zuccelli, Vigarano Mainarda, all of (IT)

(73) Assignee: Montell North Americia Inc., Wilmington, DE (US)

( * ) Notice: Subject to any disclaimer, the term of this patent is extended or adjusted under 35 U.S.C. 154(b) by 0 days.

(21) Appl. No.: 09/308,165

(22) PCT Filed: Nov. 13, 1997

(86) PCT No.: PCT/EP97/06329

§ 371 Date: May 14, 1999

§ 102(e) Date: May 14, 1999

(87) PCT Pub. No.: WO98/21273

PCT Pub. Date: May 22, 1998

(30) Foreign Application Priority Data

Nov. 15, 1996 (IT) ................................. MI96A2390

(51) Int. Cl.[7] ................ C08F 8/00; C08L 9/00; C08L 23/00

(52) U.S. Cl. .................. 525/191; 525/232; 525/240

(58) Field of Search ........................... 525/191, 232, 525/240

(56) References Cited

U.S. PATENT DOCUMENTS

| 5,338,801 | * | 8/1994 | Eppert, Jr. ............... 525/232 |
| 5,414,027 | * | 5/1995 | DeNicola, Jr. et al. . |
| 5,552,482 |   | 9/1996 | Berta ...................... 525/88 |
| 5,611,982 |   | 3/1997 | Mathavan ................ 264/131 |
| 5,744,086 |   | 4/1998 | Hallam .................... 264/296 |

FOREIGN PATENT DOCUMENTS

| 633289 | 1/1995 | (EP) . |
| 649872 | 9/1997 | (EP) . |

* cited by examiner

Primary Examiner—Nathan M. Nutter

(57) ABSTRACT

A mixture of elastomeric thermoplastic compositions which includes, on a weight percentage basis, (A) from 40 to 90% of a heterophasic polyolefin composition having a melt flow rate measured according to ASTM-D 1238, condition L, ranging from 20 to 100 g/10 min; and (B) from 10 to 60% of a heterophasic polyolefin composition that is partially dynamically crosslinked. The powders of this mixture are used in slush molding process for the production of laminated products.

10 Claims, No Drawings

POLYMER MIXTURE FOR SLUSH MOLDING

BACKGROUND OF THE INVENTION

This application is a U.S. national stage of international application PCT/EP99/06329, filed Nov. 13, 1997.

The present invention concerns a mixture of thermoplastic and elastomeric polyolefin compositions; the mixture is partially cross-linked, and has in spite of this a good melt flow rate.

The mixtures of the present invention are particularly suitable for the production of laminated articles produced by way of the slush molding process. In particular, the mixtures are used for the production of synthetic leather to be used, for example, in the automotive industry to cover some of automobile parts.

Synthetic leathers produced from thermoplastic polyolefins are already known in the art. For example, published European patent application EP-A-633 289, on behalf of Himont Incorporated, describes the use of partially cross-linked thermoplastic and elastomeric polyolefin compositions to be used in a slush molding process for the production of synthetic leathers. Said compositions have good mechanical properties, such as high elongation at break values, therefore the laminates obtained from them are adequate for use in thermoforming processes. However, these compositions present the problem of having a low melt flow rate, and consequently a number of pinholes form in the laminates produced by slush molding.

Moreover, published European patent application EP-A-637 610, on behalf of Himont Incorporated, describes thermoplastic polyolefin compositions suitable for the production of very soft synthetic leathers using a slush molding process. The leathers produced from these compositions do not have high tensile strength and elastic recovery values.

Patent application WO 95/35344 (Reydel) also describes compositions for the production of synthetic leather by way of slush molding. These compositions comprise a heterophasic matrix made of a crystalline propylene polymer and a propylene/ethylene rubber with a small content of ethylene. In order to facilitate the removal of the leathers from the mold and prevent the surfacing of low molecular weight rubbery particles that cause problems related to sticking as well as soiling the mold, said compositions also contain a resin comprising a rubber, EPR or EPDM, either cross-linked or not cross-linked. However, in order to achieve the desired properties, such as specific levels of softness of the finished product and melt flow rate, all the compositions cited in said patent application contain extender oil, as is proven by our analyses and demonstrated in the comparative examples.

Moreover, the exemplified compositions of the above mentioned patent application WO 95/35344, according to measurements we carried out which are demonstrated in the comparative examples, present tensile strength and elongation at break values that are not completely satisfactory. Good values related to said properties are important in order to prevent lacerations of the laminate when it is being removed from the mold.

BRIEF SUMMARY OF THE INVENTION

Now it has been found that it is possible to produce, by using the slush molding process, laminated articles with a good degree of softness although they do not contain extender oil. Without the extender oil, the quantity of low molecular weight material that is exuded by the laminate over time, which causes fouling and fogging, is considerably reduced, and also eliminated is the undesirable shiny and oily appearance of the laminate that is caused by the surfacing of said oil.

It has also been found that by using the mixtures of the present invention it is possible to produce, by way of slush molding, laminates with a reduced number of pinholes and reduced size of said pinholes, both on the surface, particularly the surface that is in contact with the mold, and in the inner part of said laminates. In order to achieve said result one needs a good melt flow rate of the polymer. In fact, a good melt flow rate, together with a good flowability of the polymer powder that is typical in slush molding processes, allows for a homogeneous and fast distribution of the polymer in the mold; therefore, the creation of voids that cause the formation of pinholes of various sizes in the laminate is reduced considerably, thus improving the appearance of the laminate, which would otherwise be marred by the presence of a number of big pinholes on the surface. Moreover, said pinholes are even more undesirable since usually they form also on the inside of the laminate thus reducing the mechanical properties of said laminate such as a decreased tensile strength.

In order to avoid said inconveniences a laminate has been produced from powders of a mixture of elastomeric thermoplastic compositions, said compositions containing polymer fractions having a viscosity that is sufficiently low to allow, in spite of the presence of partially cross-linked rubber, a good flow of the melt mixture during the filling of the slush-molding mold. Due to its melt flow, the mixture spreads more homogeneously, thus reducing first of all the size and number of voids and consequently of the pinholes in the laminate.

Although the mixtures of the present invention have low viscosity values, they do cause some limited fogging and stickiness to occur.

An additional advantage is the fact that the laminates obtained from said mixtures have good mechanical properties; in particular, they have tensile strength and elongation at break values that confer to the laminates good tensile strength as well as making them deformation proof. Said characteristics make it possible to remove the laminates from the molds without damaging them.

Therefore, object of the present invention is a mixture of elastomeric thermoplastic compositions comprising (weight percentage):

A) from 40 to 90%, preferably from 60 to 80%, of a heterophasic polyolefin composition (A) having a melt flow rate (measured according to ASTM-D 1238, condition L) ranging from 20 to 100 g/10 min, preferably from 30 to 60 g/10 min; and B) from 10 to 60%, preferably from 20 to 40%, of a partially dynamically cross-linked heterophasic polyolefin composition (B).

BRIEF SUMMARY OF THE INVENTION

Heterophasic polyolefin composition refers to a composition comprising polymers of the $CH_2=CHR$ olefins, where R is hydrogen or a $C_1$–$C_8$ alkyl radical; the composition comprises both crystalline and amorphous elastomeric polymers.

By definition "partially cross-linked" it is meant that to the degree of cross-linking in terms of the content of gels with respect to the weight of the fraction of elastomeric copolymer soluble in xylene at ambient temperature (i.e. about 25° C.) before cross-linking, is preferably less than or equal to 70%, more preferably less than 50%, from 3% to 45% for example. The gels content corresponds to the fraction of elastomeric copolymer that is rendered insoluble by cross-linking.

Preferably heterophasic compositions (A) and (B) are obtained from a basic composition comprising the following polymer fractions (parts and percentages by weight):

- a) 10–40 parts, preferably 20–40, of an isotactic propylene homopolymer having an isotactic index greater than 80, preferably greater than 90, or a propylene random copolymer with ethylene and/or a $C_4$–$C_{10}$ α-olefin of formula $CH_2$=CHR, where R is a $C_2$–$C_8$ alkyl radical; said copolymer containing greater than 80% of propylene and having an isotactic index in boiling heptane greater than 80;
- b) 0–20 parts of a copolymer fraction containing ethylene, insoluble in xylene at ambient temperature; and
- c) 40–95 parts, preferably 60–80, of a copolymer fraction of ethylene with propylene and/or a $C_4$–$C_{10}$ α-olefin of formula $CH_2$=CHR, where R is a $C_2$–$C_8$ alkyl radical, and optionally with a small quantity of diene; said fraction, soluble in xylene at ambient temperature, contains ethylene in quantities less than or equal to 35%, preferably from 15 to 30%.

Examples of the above mentioned basic composition are described in European patent application EP-A-0 472 946 published on behalf of Himont Incorporated.

Preferably the content of ethylene in fraction (b) is equal to or greater than 75% by weight, more preferably greater than or equal to 80% by weight, with respect to the overall weight of (b).

For example fraction (b) is a semicrystalline essentially linear copolymer of ethylene, and in addition to the ethylene, it contains preferably the same α-olefins present in fraction (c). When present, it is preferable that the quantity of said fraction be greater than 1 part by weight.

The total quantity of copolymerized ethylene in the basic composition can vary, for example, from 15 to 35% by weight.

The quantity of diene in fraction (c) ranges preferably from 1 to 4% by weight. Specific examples of the above mentioned dienes are: 1,3-butadiene, 1,4-hexadiene, 1,5-hexadiene, and 5-ethylidene-2-norbornene.

The above mentioned basic composition can be prepared by mixing components (a), (b), and (c) in the molten state, i.e., above their melt or softening temperature, or by way of sequential polymerization in two or more stages in the presence of a highly stereospecific Ziegler-Natta catalyst. In particular the catalyst system comprises (i) a solid catalyst component containing a titanium compound and an electron-donor compound both supported on a magnesium halide and (ii) an Al-trialkyl compound and an electron-donor compound.

Examples of sequential polymerization processes are described in the above mentioned european patent application EP-A-0 472946. If said component (b) is present, it is preferable that the (b)/(c) weight ratio be less than 0.4, in particular from 0.1 to 0.3. Moreover, it is preferable that the weight percentage of fraction (c) with respect to the total weight of the heterophasic composition, range from 50 to 90%, in particular from 65 to 80%.

The mixtures of the present invention that can be obtained from the above mentioned basic composition are the preferred ones. Said elastomeric thermoplastic compositions mixtures comprise:

1°) a heterophasic polyolefin composition (A) comprising the following polymer fractions (parts and percentages by weight):
- a) 10–40 parts, preferably 20–40, of an isotactic propylene homopolymer having an isotactic index greater than 80, preferably greater than 90, or a propylene random copolymer with ethylene and/or a $C_4$–$C_{10}$ α-olefin of formula $CH_2$=CHR, where R is a $C_2$–$C_8$ alkyl radical; said copolymer containing greater than 80% of propylene and having an isotactic index in boiling heptane greater than 80; said fraction having an intrinsic viscosity ranging from 0.8 to 1.3 dL/g;
- b) 0–20 parts of a copolymer fraction containing ethylene, insoluble in xylene at ambient temperature; and
- c) 40–95 parts, preferably 60–80, of a copolymer fraction of ethylene with propylene and/or a $C_4$–$C_{10}$ α-olefin of formula $CH_2$=CHR, where R is a $C_2$–$C_8$ alkyl radical, and optionally with a small quantity of diene; said fraction, soluble in xylene at ambient temperature, contains ethylene in quantities less than or equal to 35%, preferably ranging from 15 to 30%; and 2°) a partially dynamically cross-linked heterophasic polyolefin composition (B) comprising the following polymer fractions (parts and percentage by weight):
- i) 5–50 parts, preferably 5–35, of an isotactic propylene homopolymer having an isotactic index greater than 80, preferably greater than 90, or a propylene random copolymer with ethylene and/or a $C_4$–$C_{10}$ α-olefin of formula $CH_2$=CHR, where R is a $C_2$–$C_8$ alkyl radical; said copolymer containing more than 85%, preferably more than 95%, of propylene, and having an isotactic index in boiling heptane greater than 80; said fraction having an intrinsic viscosity ranging from 0.15 to 0.6 dL/g;
- ii) 50–95% parts, preferably 65–95, of an elastomeric polymer fraction partially cross-linked and partially soluble in xylene at ambient temperature, containing ethylene, propylene, and/or a $C_4$–$C_{10}$ α-olefin of formula $CH_2$=CHR, where R is a $C_2$–$C_8$ alkyl radical, and optionally a small quantity of diene;

said composition (B) comprising from 20 to 92, preferably from 40 to 80%, of a fraction (I) soluble in xylene at ambient temperature, and containing ethylene, propylene, and/or a $C_4$–$C_{10}$ α-olefin of formula $CH_2$=CHR, where R is a $C_2$–$C_8$ alkyl radical, and optionally a small quantity of diene, where the ethylene is present in fraction (I) in quantities less than or equal to 35%, preferably ranging from 15 to 30%, more preferably from 20 to 30%.

More preferably fraction (a) of composition (A) has an intrinsic viscosity ranging from 0.9 to 1.2 dL/g.

More preferably fraction (a) of composition (B) has an intrinsic viscosity ranging from 0.2 to 0.5 dL/g.

The flow rate of the powders of the mixture of the present invention is obtained both by way of known technologies, whereby one obtains regularly formed powders of reduced size and having size fairly uniform, as explained below in more details, and by the lack of stickiness exhibited by the powders produced with the mixtures of the present invention.

The desired intrinsic viscosity for compositions (A) and (B) can be obtained, for example, by way of a chemical cracking process of the polymer chain to which the composition is subjected. The chemical cracking process is carried out by using known techniques. One of said techniques is based on the use of peroxides which are added to the polymer composition in quantities sufficient to obtain the desired degree of viscosity and/or molecular weight. The peroxides that are most conveniently used for the chemical cracking process of polymer compositions have a decomposition temperature that preferably ranges from 150 to 250° C. Examples of said peroxides are di-tert-butyl peroxide, dicumyl peroxide, 2,5-dimethyl-2,5-di(tert-butylperoxy) hexene, and 2,5-dimethyl-2,5-di(tert-butylperoxy)hexane, which is sold under the trade-name Luperox 101. The quantity of peroxide necessary for the degradation process preferably ranges from 0.05 to 5%, more preferably from 0.5 to 1%, by weight with respect to the polymer.

Composition (B) is obtained by cross-linking the above mentioned basic composition. Generally speaking, any cross-linking agent known in the art can be used for the preparation of cross-linked composition (B). In particular one can use as cross-linking agents the organic peroxides that have, for example, a half-life ranging from 3 to 20 minutes, preferably from 7 to 18 minutes, at 160° C. Specific examples of peroxides are: 1,1'-bis(tert-butylperoxy) diisopropylbenzene, dicumyl peroxide, butyl-4,4'-bis(tert-butylperoxy)-valerate, 2,5-di(tert-butylperoxy)-2,5-dimethylhexane. The peroxides are generally used in quantities ranging from 0.5% to 5%, preferably from 1 to 3%, by weight with respect to the total weight of the composition that is subjected to cross-linking.

Together with the peroxides one can use a cross-linking coadjuvant. Preferred examples of coadjuvant are the 1,2-polybutadienes, triallyl cyanurates, triallyl isocyanurates, ethylene glycol dimethyl methacrylate, divinylbenzene, and furan derivatives of formula

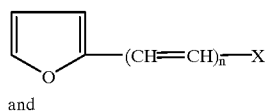

(I)

and

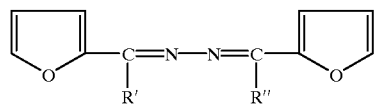

(II)

where X is a —CHO, —COOH, —CHONH, —CN, —NO$_2$, —CH$_2$—CO—CH$_2$—COOR, or —CH(COOR)$_2$, where R is a C$_6$–C$_8$ aryl or C$_1$–C$_4$ alkyl, n is 1 or 2, R$^1$ and R$^2$, equal or different, are hydrogen, C$_1$–C$_4$ alkyl, C$_5$–C$_8$ cycloalkyl.

Generally the 1,2-polybutadienes have a molecular weight of at least 1300, preferably ranging from 2400 to 13000. The content of vinyl groups in configuration 1,2 is preferably equal to or greater than 50%, in particular from 50 to 90%. One specific example is the Lithene Ph (by Revertex).

The composition (B) used in the present invention is subjected to a dynamic cross-linking process. Said process consists of subjecting the basic composition to a mixing process at temperatures equal to or greater than the softening or melting temperature of composition (B) in the presence of a cross-linking agent, which can be added before, during, or after the first mixing phase, and continuing said mixing even during the cross-linking phase. The mixing can be carried out, for example, in an internal mixer (Banbury type) or in a twin screw and/or Buss extruder, or in a system which combines the two.

The dynamic cross-linking process is carried out for a period of time that can vary, preferably ranging from 40 seconds to 6 minutes, and at a temperature that preferably ranges from 140 to 220° C.

An indirect evaluation of the degree of cross-linking can be estimated, as indicated above, by the quantity of gels that form due to the cross-linking which reduce the solubility of component (C) of the initial composition. Said quantity is calculated using the following formula:

% gel=$(C-X)\cdot(1/C)\cdot100$ where C is the percentage of component (C) in the initial composition, while X is the soluble fraction of the partially cross-linked composition. In said formula, the solubility contribution of component (A) in the initial composition is overlooked since it is very nominal compared to that of component (C).

Preferred examples of polyolefin compositions (B) that can be used for the production of the mixture of the present invention are cited in the above mentioned European patent application EP-A-633 289, whose description is incorporated herein for reference.

To the mixture of the elastomeric thermoplastic compositions of the present invention one preferably adds a substance that increases further the flow rate of the powder, such as silica, in quantities ranging from 0.5 to 2% by weight.

Moreover, the mixture of the elastomeric thermoplastic compositions of the present invention can also contain the usual substances that are present in the polyolefin compositions comprising elastomers that are added to compositions subjected to mixing and cross-linking, such as for example mineral fillers, plasticizing agents, carbon black, pigments, and stabilizing agents.

The above mentioned heterophasic compositions (A) and (B), and optionally other components, are mixed in the above mentioned proportions using known equipment, such as a Banbury, a Buss, or a single-screw and/or double-screw extruder. Subsequently the mixture is subjected to milling at very low temperatures, using liquid nitrogen as the cooling medium, for example, until it is reduced to a powder. For use in the slush molding process it is preferable that the powders of the polyolefin composition of the present invention have a regular form. It is also preferable that they have a narrow particle size distribution and a small diameter. In particular, it is preferable that the diameter of the particles be less than 500 μm, preferably less than 350 μm, more preferably not more than 5% by weight of the particles have a diameter greater than 300 μm, more preferably 250 μm. For example, one can use a powder where not more than 5% by weight of the particles have a diameter greater than 250 μm, and 50% by weight of the particles have a diameter ranging from 150 to 160 μm, for example.

The powders obtained from the mixture of the present invention are used in slush molding processes. The process technologies and methods used are those traditionally known and utilized, for example, for the production of polyvinyl chloride.

One of the examples describing the process where the mixtures of the present invention are used comprises the following steps:

I) heating of the mold (in an oven, for example) to a temperature ranging from 200 to 280° C.;

II) introduction of the polyolefin composition powders in the mold and subsequent melting of the powders;

III) further melting of the outer surface of the polymer sheet that formed in the mold of step (II), by way of postheating (in an oven for example), in order to eliminate possible surface irregularities; and IV) cooling and removal of the laminate thus obtained.

The product can be used as is in the form of synthetic leather, or can be subjected to further treatments, such as painting and lacquering.

The following examples are given in order to illustrate but not limit the present invention.

The data relative to the properties of the products, the mixtures, the compositions, and the specimens obtained in the examples and comparative examples have been determined by way of the following methods:

Melt Flow Rate (MFR): ASTM-D 1238
Solubility in xylene: (see Note 1 below)
Number of pinholes per surface unit: (see Note 2 below)
Average pinhole diameter: (see Note 2 below)
Maximum pinhole diameter: (see Note 2 below)
Flexural modulus of elasticity: ASTM D-790
Shore A Hardness: ASTM D-2240
Compression set: ASTM D-395, method B
Tensile strength: ASTM D-412
Elongation at break: ASTM D-412
Fogging Test: DIN 75201

Note 1. Determination of the percentage soluble in xylene: one prepares a solution of the sample in xylene at a weight concentration of 1%, keeping the sample in xylene for one hour at 135° C. while stirring. Continuing to stir the content is allowed to cool to 95° C., after which the solution is poured in a 25° C. bath, and left there for 20 minutes without stirring, and for an additional 10 minutes while stirring. The solution is then filtered, and acetone is added to a portion of the filtrate in order to obtain the precipitation of the dissolved polymer. The polymer thus obtained is then recovered, washed, dried, and then weighed in order to determine the percentage soluble in xylene.

Note 2. Determination of the number of pinholes per surface unit, and the average and maximum pinhole diameter: the number of pinholes has been determined by counting the pinholes per surface unit from a photograph of the leather obtained with a Wild stereo microscope operating in reflection at a 20× enlargement. The determination of their dimension was done assuming that the surface of the pinhole section is circular. The maximum diameter of the largest pinhole was measured, and the average diameter of the pinholes was calculated mathematically.

The compositions used in the examples and the comparative examples are as follows:

I) Heterophasic composition, where the MFR is 0.6 g/10 min, comprising (weight percentage):
   a) 33% of a crystalline propylene random copolymer with 4.3% of ethylene; 9% of the copolymer is insoluble in xylene at 25° C., and its intrinsic viscosity [η] is 1.5 dL/g;
   b) 6% of an ethylene/propylene copolymer totally insoluble in xylene at 25° C.; and
   c) 61% of an amorphous ethylene/propylene copolymer with 30% of ethylene, totally soluble in xylene at 25° C., and having an intrinsic viscosity [η] of 3.1 dL/g.

The composition was obtained by way of sequential polymerization in the presence of a high-yield and highly stereospecific Ziegler-Natta catalyst supported on magnesium chloride.

II) Heterophasic composition having the same quantities and components of composition (I), but with a MFR of 40 g/10 min and an intrinsic viscosity [η] of fraction (a) of about 1. The composition is obtained by way of chemical cracking of composition (I) with the proper quantity of Trigonox 101/50 peroxide.

(III) Heterophasic composition having the same quantities and components of composition (I), with the difference that it is partially cross-linked, said cross-linking having been obtained using the dynamic cross-linking process. The intrinsic viscosity [η] of fraction (a) is about 0.35 dL/g. The cross-linking took place in the presence of Trigonox 101/50 peroxide and 1,2-polybutadiene (Lithene PH). The percentage of gels calculated according to the formula set forth in the description is about 38.4. The composition is prepared as described in the above mentioned European patent application EP-A-633 289, whose description is incorporated herein for reference.

IV) Heterophasic composition comprising 32% by weight of a dynamically cross-linked ethylene/propylene/diene rubber, Dutral TER 537 E2 type, 6.5% by weight of crystalline propylene homopolymer, 6.5% by weight of a styrene polymer, and 32% by weight of extender oil.

V) Resin marketed by Mitsui Petrolchemical, reference Milastomer 6030 N: according to our analyses it is a partially dynamically cross-linked elastomeric thermoplastic composition containing 23% by weight of extender oil.

VI) Resin marketed by Mitsui Petrolchemical, reference Milastomer 9020 N: according to our analyses it is a partially dynamically cross-linked elastomeric thermoplastic composition without extender oil.

The properties of the above mentioned compositions as reported in table 1 have been determined using 120×120 mm plates having a thickness ranging from 1 to 3 mm. Said plates have been obtained by compression molding at 200° C., operating first for 3 minutes without pressure, then for an additional 3 minutes at 200 bar, and finally cooling the plate to 23° C. under pressure.

EXAMPLE 1

In a twin-screw extruder one mixed and extruded at 180° C. 70 parts by weight of composition (II) with 30 parts by weight of composition (III).

The extruded mixture, having a MFR of 36 g/10 min at 230° C./2.16 kg, was then milled at a temperature ranging from −70 to −100° C., thus obtaining a powder with a particle size distribution corresponding to what is reported in the description.

The milled product was then mixed with 0.7% by weight of Sylobloc 45H (by Grace).

Finally, the powder was used in a slush molding process at 230° C., for 20 seconds of contact, 2 minutes of postcure at 230° C., and subsequent cooling, thus obtaining a leather with the dimensions and pinhole density reported in table 2.

In table 3 are reported the mechanical properties of the compression molding plates prepared as described above.

COMPARATIVE EXAMPLE 1 (1c)

Example 1 was repeated, with the exception that instead of compositions (II) and (III), one used composition (II) with a MFR of 40 g/10 min at 230° C./2.16 kg.

The dimensions and pinhole density of the leather obtained in this manner are reported in table 2.

In table 3 are reported the mechanical properties of the compression molding plates prepared as described above.

COMPARATIVE EXAMPLE 2 (2c)

Example 1 was repeated, with the exception that instead of composition (III), one used composition (IV). The mixture obtained had a MFR of 28 g/10 min at 230° C./2.16 kg.

The dimensions and pinhole density of the leather obtained in this manner are reported in table 2.

In table 3 are reported the mechanical properties of the compression molding plates prepared as described above. The plate appeared sticky.

COMPARATIVE EXAMPLE 3 (3c)

The mixing and extrusion of example 1 were repeated, except that one used 90 parts by weight of composition (II), and 10 parts by weight of composition (V).

The mechanical properties of the compression molding plates prepared as described above are reported in table 3.

COMPARATIVE EXAMPLE 4 (4c)

Example 3c was repeated, except that one used 70 parts by weight of composition (II), and 30 parts by weight of composition (V).

The mechanical properties of the compression molding plates prepared as described above are reported in table 3.

COMPARATIVE EXAMPLE 5 (5c)

The mixing and extrusion of example 1 were repeated, except that one used 90 parts by weight of composition (II), and 10 parts by weight of composition (VI).

The mechanical properties of the compression molding plates prepared as described above are reported in table 3.

COMPARATIVE EXAMPLE 6 (6c)

Comparative example 5c was repeated, except that one used 70 parts by weight of composition (II), and 30 parts by weight of composition (VI).

The mechanical properties of the compression molding plates prepared as described above are reported in table 3.

TABLE 1

| Properties | Compositions | | | | | |
|---|---|---|---|---|---|---|
| | I | II | III | IV | V | VI |
| Flexural Modulus (MPa) | 90 | 70 | 90 | <30 | <30 | ≦200 |
| MFR[1] (g/10') | 0.6 | 40 | 6 | <1 | — | — |
| MFR[2] (g/10') | — | — | — | — | 7 | 2.3 |
| Tensile strength (MPa) | 22 | 5.1 | 11.5 | 48 | 5 | 9 |
| Elongation at break (%) | 850 | 365 | 510 | 420 | 500 | 600 |
| Tension set 100% (%) | 35 | 40 | 30 | 10 | 8 | 30 |
| Shore A, 5 sec (points) | 90 | 88 | 91 | 60 | 55 | 89 |
| Compression set[3] (%) | 87 | 95 | 62 | 31 | 34 | 59 |
| Oil absorption[4] (weight %) | +346 | +205 | +266 | +90 | +253 | +250 |
| Fogging test % | 98 | 78 | >90 | 65 | 41 | 95 |

[1] measured at 230° C./2.16 kg;
[2] measured at 230° C./5 kg;
[3] at 70° C. for 22 hours;
[4] ASTM-3, conditions: 166 hours at 100° C., measured as weight % difference between the weight before and after the test.

TABLE 2

| Examples and comparative examples | number of pinholes/cm$^2$ | maximum pinhole diameter (mm) | average pinhole diameter (mm) |
|---|---|---|---|
| 1 | <20 | 0.08 | 0.02 |
| 1C | 1000 | 0.2 | 0.03 |
| 2C | 450 | 0.15 | 0.05 |

TABLE 3

| Ex. and compar. examples | Tensile strength (MPa) | Elongation at break (%) | Shore A 5 seconds (points) | Fogging test (%) |
|---|---|---|---|---|
| 1 | 8.2 | 645 | 89 | 94 |
| 1c | 5.3 | 385 | 88 | 78 |
| 2c | 4.9 | 490 | 80 | 81 |
| 3c | 4.95 | 325 | 82 | 74 |
| 4c | 4.9 | 470 | 78 | 66 |
| 5c | 5.4 | 475 | 87 | 81 |
| 6c | 4.5 | 180 | 87 | 87 |

What is claimed is:

1. A mixture of elastomeric thermoplastic compositions comprising (weight percentage):
   A) from 40 to 90% of a heterophasic polyolefin composition (A) having a melt flow rate (measured according to ASTM-D 1238, condition L) ranging from 20 to 100 g/10 min; and
   B) from 10 to 60% of a partially dynamically cross-linked heterophasic polyolefin composition (B);
   where composition (A) comprises the following polymer fractions (parts and percentage by weight):
   a) 10–40 parts of an isotactic propylene homopolymer having an isotactic index greater than 80, or a propylene random copolymer with ethylene and/or a $C_4$–$C_{10}$ α-olefin of formula $CH_2$=CR where R is a $C_2$–$C_8$ alkyl radical, with an isotactic index in boiling heptane greater than 80; said fraction having an intrinsic viscosity ranging from 0.8 to 1.3 dL/g;
   b) 0–20 parts of a copolymer fraction containing ethylene, insoluble in xylene at ambient temperature; and
   c) 40–95 parts of a copolymer fraction of ethylene with propylene and/or a $C_4$–$C_{10}$ α-olefin of formula $CH_2$=CHR, where R is a $C_2$–$C_8$ alkyl radical, and optionally a small quantity of diene; said fraction, soluble in xylene at ambient temperature, contains ethylene in quantities less than or equal to 35%;
   and composition (B) comprises the following polymer fractions (parts and percentage by weight):
   i) 5–50 parts of an isotactic propylene homopolymer having an isotactic index greater than 80, or a propylene random copolymer with ethylene and/or a $C_4$–$C_{10}$ α-olefin of formula $CH_2$=CHR, where R is a $C_2$–$C_8$ alkyl radical; said copolymer containing more than 85%, of propylene, and having an isotactic index in boiling heptane greater than 80; said fraction having an intrinsic viscosity ranging from 0.15 to 0.6 dL/g;
   ii) 50–95 parts, of an elastomeric polymer fraction partially cross-linked and partially soluble in xylene at ambient temperature, containing ethylene, propylene, and/or a $C_4$–$C_{10}$ α-olefin of formula $CH_2$=CHR, where R is a $C_2$–$C_8$ alkyl radical, and with optionally a small quantity of diene;
   said composition (B) comprising from 20 to 92% of a fraction (I) soluble in xylene at ambient temperature, and containing ethylene, propylene, and/or a $C_4$–$C_{10}$ α-olefin of formula $CH_2$=CHR, where R is a $C_2$–$C_8$ alkyl radical, and optionally a small quantity of diene, where the ethylene is present in fraction (I) in quantities less than or equal to 35%.

2. The mixture of claim 1, where composition (A) ranges from 60 to 80% by weight.

3. The mixture of claim 1, where composition (A) ranges from 20 to 40% by weight.

4. The mixture of claim 1, where composition (A) has a melt flow index ranging from 30 to 60 g/10 min.

5. The mixture of claim 1, where fraction (a) of component (A) has an intrinsic viscosity ranging from 0.9 to 1.2 dL/g.

6. The mixture of claim 5, where fraction (a) of component (B) has an intrinsic viscosity ranging from 0.2 to 0.5 dL/g.

7. A process comprising slush molding a mixture of elastomeric thermoplastic compositions comprising (weight percentage):

(A) from 40 to 90% of a heterophasic polyolefin composition (A) having a melt flow rate measured according to ASTM-D 1238, condition L, ranging from 20 to 100 g/10 min; and (B) from 10 to 60% of a partially dynamically crosslinked heterophasic polyolefin composition (B);

where composition (A) comprises the following Polymer fractions (parts and percentages by weight):

a) 10–40 parts of an isotactic propylene homopolymer having an isotactic index greater than 80, or a propylene random copolymer with ethylene and/or a $C_4$–$C_{10}$ α-olefin of formula $CH_2$=CHR, where R is a $C_2$–$C_8$ alkyl radical, with an isotactic index in boiling heptane greater than 80; said fraction having an intrinsic viscosity ranging from 0.8 to 1.3 dL/g;

b) 0–20 parts of a copolymer fraction containing ethylene, insoluble in xylene at ambient temperature;

c) 40–95 parts of a copolymer of ethylene with propylene and/or a $C_4$–$C_{10}$ α-olefin of formula $CH_2$=CHR, where R is a $C_2$–$C_8$ alkyl radical, and optionally a small quantity of diene; said fraction, soluble in xylene at ambient temperature, contains ethylene in quantities less than or equal to 35%;

and composition (B) comprises the following polymer fractions (parts and percentages by weight):

i) 5–50 parts of an isotactic propylene homopolymer having an isotactic index greater than 80, or a propylene random copolymer with ethylene and/or a $C_4$–$C_{10}$ α-olefin of formula $CH_2$=CHR, where R is a $C_2$–$C_8$ alkyl radical; said copolymer containing more than 85% of propylene, and having an isotactic index in boiling heptane greater than 80; said fraction having an intrinsic viscosity ranging from 0.15 to 0.60 dL/g;

ii) 50–95 parts, of an elastomeric polymer fraction partially crosslinked and partially soluble in xylene at ambient temperature, containing ethylene, propylene and/or a $C_4$–$C_{10}$ α-olefin of formula $CH_2$=CHR, where R is a $C_2$–$C_8$ alkyl radical, and optionally with a small quantity of a diene;

said composition (B) comprising from 20 to 90% of a fraction (I) soluble in xylene at ambient temperature and containing ethylene, propylene and/or a $C_4$–$C_{10}$ α-olefin of formula $CH_2$=CHR, where R is a $C_2$–$C_8$ alkyl radical, and optionally with a small quantity of a diene; where the ethylene is present in fraction (I) in quantities less than or equal to 35%.

8. The process of claim 7, where the diameter of the powder particles is less than 500 μm.

9. Laminated product obtained by way of slush molding with the powders of the mixture of claim 1.

10. The mixture of claim 1, wherein the isotactic propylene homopolymer a) of heterophasic polyolefin composition (A) has an isotactic index greater than 90.

* * * * *

UNITED STATES PATENT AND TRADEMARK OFFICE
CERTIFICATE OF CORRECTION

PATENT NO. : 6,204,330 B1
DATED : March 20, 2001
INVENTOR(S) : Vittorio Braga et al.

It is certified that error appears in the above-identified patent and that said Letters Patent is hereby corrected as shown below:

Column 11,
Line 7, change "(A)" to -- (B) --.

Signed and Sealed this

Fifteenth Day of March, 2005

JON W. DUDAS
*Director of the United States Patent and Trademark Office*